United States Patent [19]

Barlow et al.

[11] Patent Number: 4,799,222

[45] Date of Patent: Jan. 17, 1989

[54] ADDRESS TRANSFORM METHOD AND APPARATUS FOR TRANSFERRING ADDRESSES

[75] Inventors: George J. Barlow, Tewksbury, Mass.; James W. Keeley, Nashua, N.H.; Chester M. Nibby, Jr., Beverly, Mass.

[73] Assignee: Honeywell Bull Inc., Waltham, Mass.

[21] Appl. No.: 1,124

[22] Filed: Jan. 7, 1987

[51] Int. Cl.[4] .............................................. G06F 11/10
[52] U.S. Cl. ..................................................... 371/51
[58] Field of Search ...................... 371/50, 51, 49, 37, 371/38; 364/200, 900

[56] References Cited

U.S. PATENT DOCUMENTS

| | | | |
|---|---|---|---|
| 4,271,521 | 6/1981 | Mahmoad | 371/51 |
| 4,483,003 | 11/1984 | Beal | 371/51 |
| 4,639,917 | 1/1987 | Furuta | 371/49 |
| 4,644,546 | 2/1987 | Doi | 371/49 |
| 4,692,893 | 9/1987 | Casper | 371/51 |

Primary Examiner—Michael R. Fleming
Attorney, Agent, or Firm—Faith F. Driscoll; John S. Solakian

[57] ABSTRACT

An address path which transfers addresses from a number of sources includes an incrementing circuit. The address includes a plurality of address bits and integrity bits. The address bits are applied to the incrementing circuit while the integrity bits are applied in parallel to a programmable logic device (PLD). While the address is being transferred or incremented as required, the PLD independently generates a number of transform bits defining a characteristic of the number of address bits predicted to change state. Thereafter, the transform bits are used to transform the address integrity bits for transfer with the incremented address. The incremented address, transform bits and integrity bits are logically combined for verifying that the address was transferred and/or incremented without error.

20 Claims, 4 Drawing Sheets

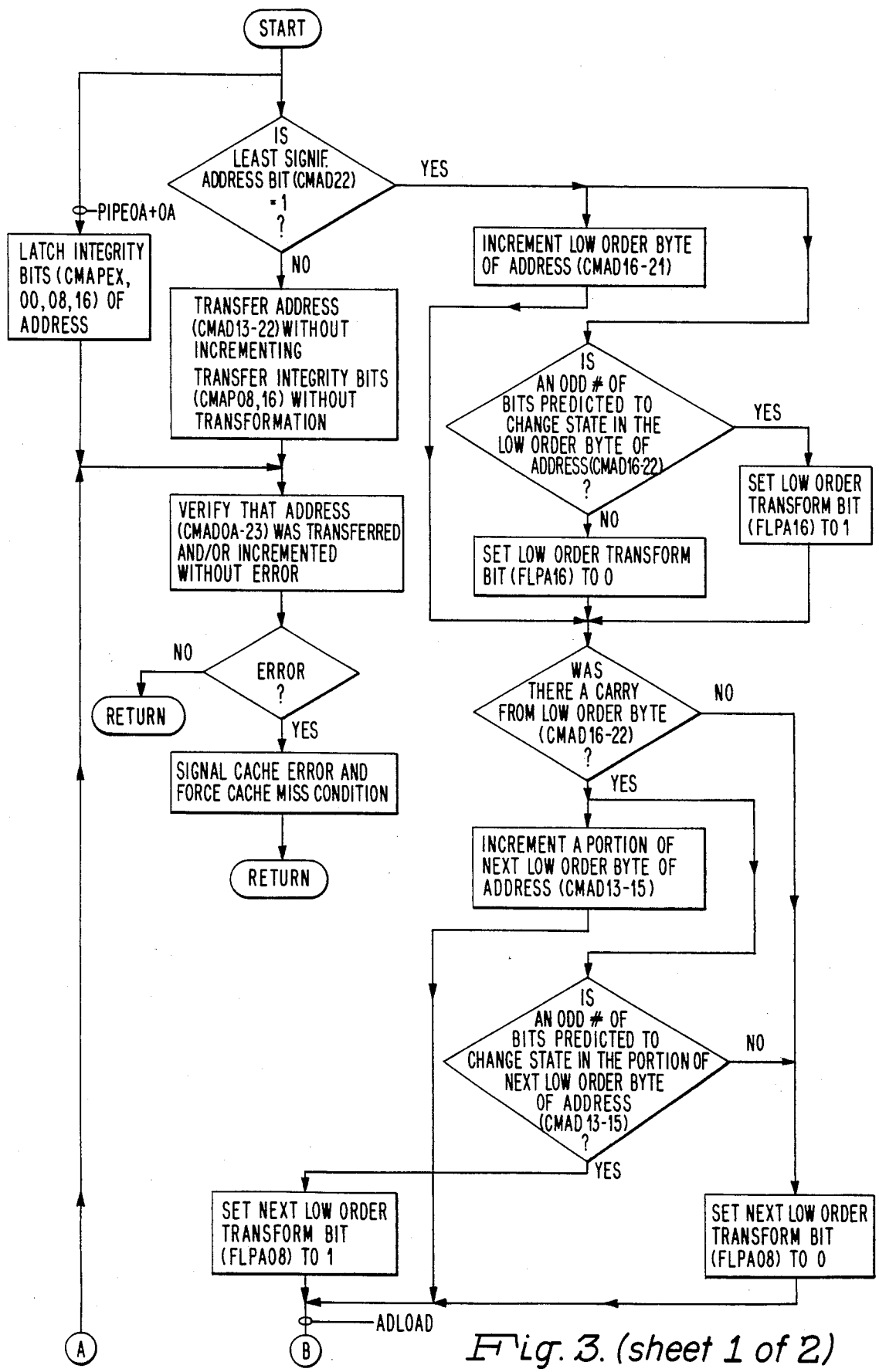
Fig. 3. (sheet 1 of 2)

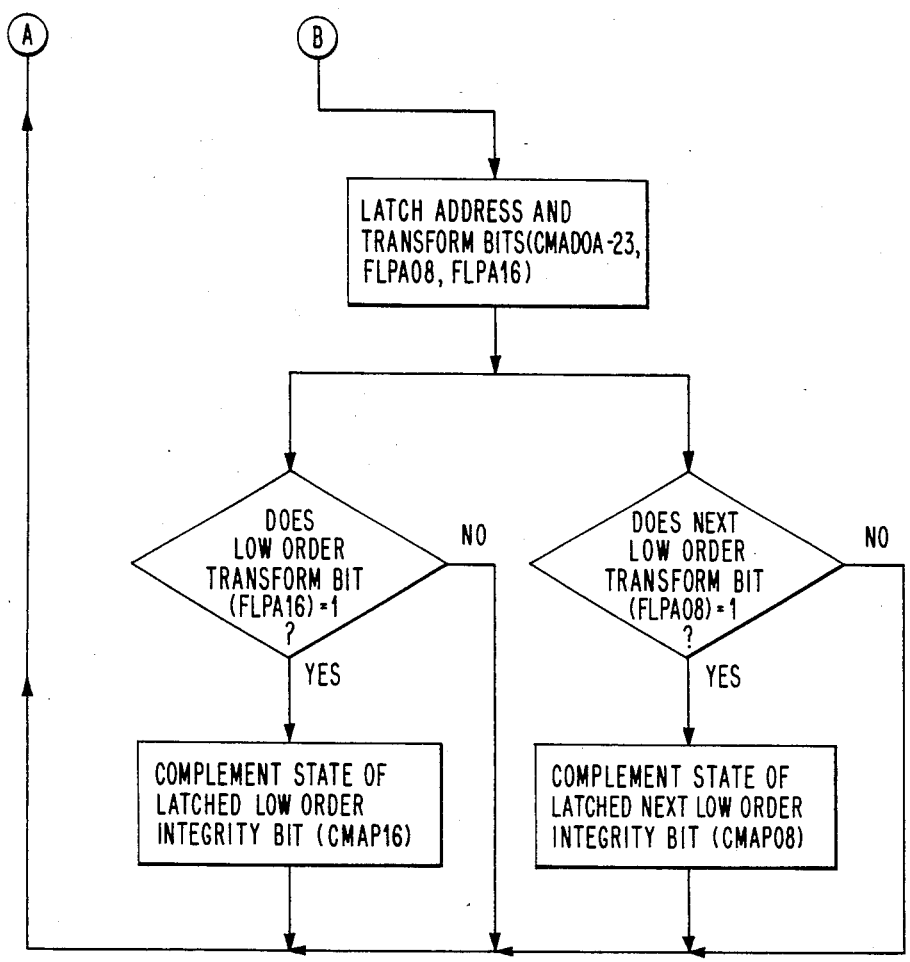
Fig. 3. (sheet 2 of 2)

ADDRESS TRANSFORM METHOD AND APPARATUS FOR TRANSFERRING ADDRESSES

RELATED PATENT APPLICATION

The patent application of James W. Keeley and Thomas F. Joyce entitled, "Multiprocessor Shared Pipeline Cache Memory", issued as U.S. Pat. No. 4,695,943 on Sept. 22, 1987, which is assigned to the same assignee as this patent application.

BACKGROUND OF THE INVENTION

1. Field of Use

This invention relates to address transfer apparatus and more particularly to methods and apparatus for veryifying that address information is being transferred without error.

2. Prior Art

In general, many data processing systems do not include apparatus which check address transfers, particularly when the address being transferred is used to access a memory device. To ensure that memory addressing proceeded properly in such instances, one prior art approach was to combine the parity bits of the address applied to the memory device with the address of the data and store the resulting information in the addressed location.

During a subsequent cycle, the stored resulting bit was used to signal the presence of an error or fault condition associated with the location being accessed. An example of such an arrangement is described in U.S. Pat. No. 3,789,204 titled, "Self-Checking Digital Storage System", invented by George J. Barlow.

While the above arrangement was effective in detecting memory faults or errors, it only detected indirectly errors occurring during the transfer of the address. The verification of such transfers becomes particularly important where address being transferred passes through an incrementing circuit. In this type of arrangement, it becomes difficult to ensure that the resulting address is valid without adding a substantial amount of circuit redundancy. That is, a common approach has been to provide two address incrementing circuits and a comparator. The comparator by comparing the incremental addresses generated by both incrementing circuits is able to verify that the incrementing operation took place without error. Thereafter, new parity can be generated for the verified incremented address.

In addition to the added duplication, the above approach increases substantially, the amount of time required for verifying that the address transfer proceeded without error. In today's high speed data processing systems, the introduction of this type of address verification can substantially reduce system performance. This problem is further compounded where the addresses being transferred have undergone a virtual to physical address translation operation which involved the generation of parity bits further delaying the transfer of the address to the memory device such as a cache memory. In such arrangements, disparities in time between the availability of the generated parity bits associated with the physical address and the normal availability of physical address further adversely affects system performance resulting in more stringent requirements being placed on the virtual memory management unit which performs such address translations.

Accordingly, it is a primary object of the present invention to provide an improved method and apparatus for transferring addresses and their associated integrity bits through an address path which includes an incrementing circuit.

It is a further, more specific object of the present invention to provide an improved method and apparatus which verifies if the transfer of addresses proceeded without error.

SUMMARY OF THE INVENTION

The above and other objects of the present invention are achieved in a preferred embodiment. The method and apparatus of the present invention find particular utilization within a pipeline cache memory system such as that disclosed in the related copending patent application of James W. Keeley, et al. In such a system, addresses which have been translated by a processing unit's virtual memory management unit (VMMU) or received from a system bus are presented as part of the requests for accessing cache data. In order to maintain high performance by the cache pipelined stages, the requests must be received within a certain time interval or valuable cache cycles will be lost. Another important consideration is that there is a need to increment the addresses provided to the cache memory system. Since it is important that such systems have high reliability, integrity or parity bits are included as parts of such addresses.

The present invention provides a method and apparatus for generating integrity bits for addresses transferred through an address path which includes an incrementing circuit and for verifying if the transfer occurred without error. This is accomplished by separating the integrity bits from each address and generating a corresponding number of transform bits which indicate a predetermined characteristic of the predicted change in state of the number of bits within the address. The transform bits are then used to transform the original integrity bits into integrity bits for the incremented address.

By separately transforming the integrity bits of the address into integrity bits for the incremented address, both operations can be accomplished within a minimum of time. Moreover, the present invention allows for disparities in time of arrival between the address and its integrity bits. This reduces the time constraints which are imposed on the address sources such as a VMMU. Also, it maintains a high performance level within the address receiving unit such as the cache memory of the preferred embodiment.

The present invention facilitates reliability by providing a method and apparatus for verifying that address incrementing and/or transfer was performed without errors. This is done by logically combining the incremented address, the transform bits and integrity bits of the unincremented address. When an error is indicated, the logical result is then used to override the cache directory cycle and force a cache miss condition. To allow for further disparities in the arrival times of the addresses and their integrity bits, the integrity bits of the unincremented address which are last to arrive are combined with the result of combining the incremented address and transform bits.

In the preferred embodiment, the operation of generating the transform bits is carried out by a programmable logic device (PLD). According to the invention, the PLD generates the transform bit by determining from the received address, the predetermined characteristic which, in the preferred embodiment, is whether the number of bits predicted to change by incrementing the address is an odd number.

In those systems, in which the address and its integrity bits are known to arrive at the same time, the PLD can be used in the same manner to transform the integrity bits of the received address into the integrity bits of an incremented address. In this case, the PLD carries out the operations of generating the transform bits and complementing the integrity bits of the received address according to the states of the transform bits.

The novel features which are believed to be characteristic of the invention both as to its organization and method of operation, together with further objects and advantages will be better understood from the following description when considered in connection with the accompanying drawings. It is to be expressly understood, however, that each of the drawings is given for the purpose of illustration and description only and is not intended as a definition of the limits of the present invention.

BRIEF DESCRIPTION OF THE DRAWINGS

FIGS. 3 and 4 are flow and timing diagrams respectively used to explain the operation of the method and apparatus of the present invention.

DESCRIPTION OF THE PREFERRED EMBODIMENT

Figure 1:
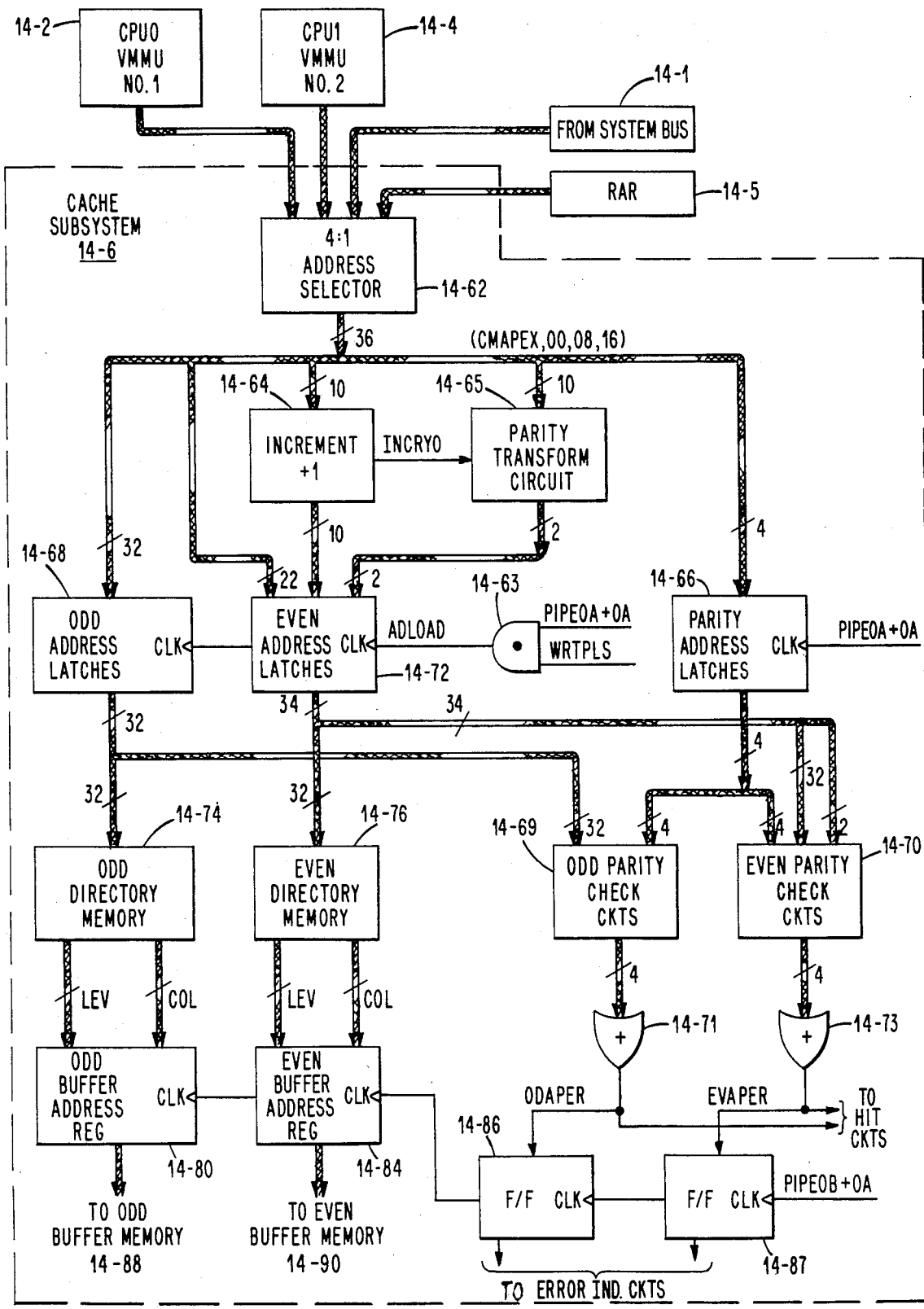
FIG. 1 is a block diagram of a cache subsystem which incorporates the method and apparatus of the present invention.

FIG. 1 shows in block diagram form, the organization of a cache subsystem 14-6 which incorporates the method and apparatus of the present invention. As shown, the cache subsystem 14-6 receives memory requests from a plurality of sources 14-1 through 14-5. These sources include a pair of central processing unit (CPU) subsystems 14-2 and 14-4, a system bus source 14-1 and a replacement address register (RAR) source 14-5.

Each of the CPU subsystems 14-2 and 14-4 include a virtual memory management unit (VMMU) for translating CPU virtual addresses into physical addresses for presentation to cache subsystem 14-6 as part of the memory requests. The system bus source 14-1 includes a FIFO subsystem whcih couples to a system bus and to the replacement address register (RAR) source 14-5. The FIFO subsystem receives all of the information transferred between any units connected to the bus in addition to any new data resulting from a memory request being forwarded to the system bus by cache subsystem 14-6.

Cache subsystem 14-6 is organized into a source address generation section and two separate pipeline stages, each with its own decode and control circuits. The source address generation section includes blocks 14-62 through 14-65 which perform the functions of source address selection and generation. The first pipeline stage is an address stage and includes the directory and associated memory circuits of blocks 14-66 through 14-76, arranged as shown. This stage performs the functions of latching the generated source address, directory searching and hit comparing. The first pipeline stage provides as an output information in the form of a level number and a column address. The operations of the first pipeline stage are clocked by timing signals generated by the timing and control circuits within the subsystem 14-6.

The information from the first stage is immediately passed onto the second pipeline stage leaving the first stage available for the next source request. The second pipeline stage is a data stage and includes the data buffer and associated memory circuits of blocks 14-80 through 14-87, arranged as shown. This stage performs the functions of accessing the requested data from the buffer memories 14-88 and 14-90, or replacing/storing data with data received from the system bus 14-1. The second pipeline stage provides a 36-bit data word for transfer to one of the CPU subsystems 14-2 and 14-4. Again, the operations of the second pipeline stage are clocked by timing signals generated by cache subsystem timing and control circuits.

The basic timing for each of the subsystem sources of FIG. 1 is established by the cache subsystem timing and control circuits. Such control permits the conflict-free sharing of cache subsystem 14-6 by CPU subsystems 14-2 and 14-4 and bus 14-1 including RAR source 14-5. These circuits are described in greater detail in the related patent application. Briefly, these circuits include address select logic circuits which generate control signals for conditioning address selector 14-62 to select one of the subsystems 14-2, 14-4 or 14-1/14-5 as a request address source.

Also, the timing circuits include pipeline clock circuits which define the different types of cache memory cycles which can initiate the start of the pipeline. This results in the generation of a predetermined sequence of signals in response to each request which includes signals WRTPLS, PIPE0A+0A and PIPE0B+0A. That is, first and second signals, respectively, indicate a cache request for service by CPU0 subsystem 14-2 and CPU1 subsystem 14-4 while other signals indicate cache requests for service by system bus 14-1.

The different blocks of the first and second pipeline stages are constructed from standard integrated circuits, such as those described in the "The TTL Data Book, Volume 3", Copyrighted 1984, by Texas Instruments Inc. and in the "Advanced Micro Devices Programmable Array Logic Handbook", Copyright 1983, by Advanced Micro Devices, Inc. For example, the address selector circuit of block 14-62 is constructed from two sets of six 74AS857 multiplexer chips cascaded to select one of four addresses. The latches of blocks 14-68 and 14-72 are constructed from 74AS843 latch chips.

The directory memories 14-74 and 14-76 are constructed from 8-bit slice cache address comparator circuits having part number TMS2150JL, manufactured by Texas Instruments Incorporated. The address registers 14-80 and 14-84 are constructed from 9-bit interface flip-flops having part number SN74AS823, manufactured by Texas Instruments, Inc. The address increment circuits of block 14-64 are constructed from standard ALU chips designated by part number 74AS181A.

As seen from FIG. 1, cache subsystem 14-6 is organized into even and odd sections which permit two data words to be accessed simultaneously in response to either an odd or even memory address. The arrangement of the present invention enables the transfer of parity bits included within the even and odd memory addresses presented by the address sources through the cache pipeline stages. That is, in parallel with the required incrementing being performed by incrementing circuit 14-64, apparatus in the form of parity transform circuit 14-65 generates a plurality of transform bits (FLPA08, FLPA16) which are stored in even address latches 14-72 in response to a load address signal ADLOAD in place of the parity bits of the address bits received from selector circuit 14-62 which are required to be incremented. An AND gate 14-63 generates the signal ADLOAD by combining signals WRTPLS and PIPE0A+0A.

Figure 2A:
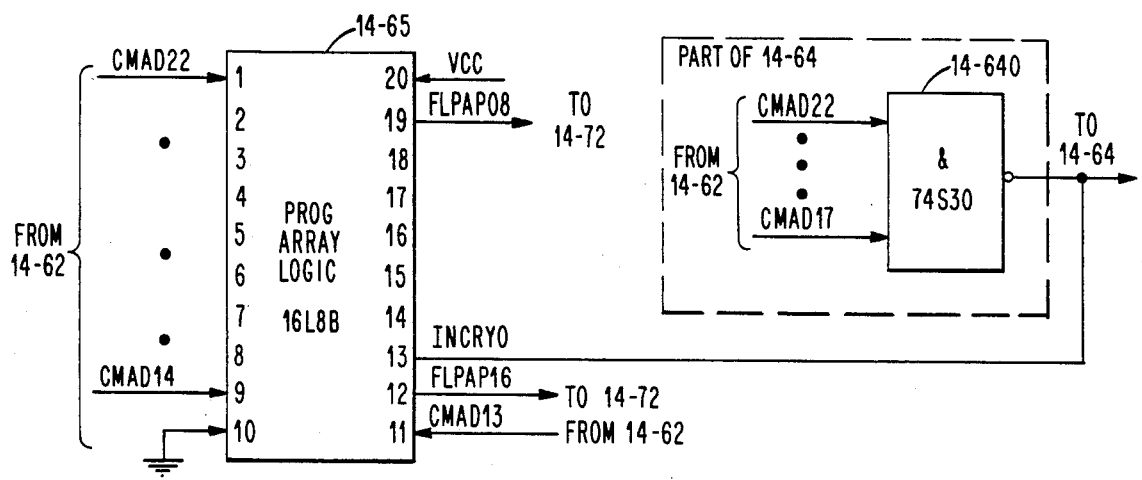
FIGS. 2a and 2b shown in greater detail portions of the cache subsystem of FIG. 1.

The increment circuit 14-64 includes a lookahead circuit shown in greater detail in FIG. 2a which generates as an output, an increment carry signal INCRY0. This signal is applied as an input to transform circuit 14-65, also shown in greater detail in FIG. 2a. The transform circuit 14-65 is constructed from a programmable array logic (PAL) element having part number AmPAL16L8B, manufactured by Advanced Micro Devices, Inc. As explained herein in greater detail, the PAL circuit 14-65 is specially programmed or burned according to the present invention to generate the required transform bits.

In the preferred embodiment, only a portion (i.e., 10 bits) of the entire physical address is incremented while the remaining address bits are transferred through the cache subsystem pipeline stages unchanged. Thus, the ten address bits (CMAD 13-22) which corresponds to the low order byte and a portion of the next low order byte of the address received from selector circuit 14-62 are applied as inputs to transform circuit 14-65. Also, the parity bits (CMAPEX, CMAP00, CMAP08 and CMAP16) for the selected address are separated from the source address and loaded into the parity address latches 14-66, in response to timing signal PIPE-0A+0A.

Additional, cache subsystem 14-6 also includes odd and even parity check circuits 14-69 and 14-70, a pair of OR gages 14-71 and 14-73 and a pair of pipeline storage flip-flops 14-86 and 14-87 arranged as shown. According to the present invention, these circuits verify that the address transfer or address incrementing operation performed by circuit 14-64 proceeded without error. The check circuits 14-69 and 14-70 generate the required error signals for all four address bytes which are grouped within OR gate circuits 14-71 and 14-73. The odd and even parity error signals ODAPER and EVAPER from OR gates 14-71 and 14-73 are stored in error flip-flops 14-86 and 14-87 in response to timing signal PIPE0B+0A.

The parity check circuits 14-69 and 14-70 are constructed from standard parity generator circuits designated by part number 74AS280 while error flip-flops are constructed from standard clocked flip-flops designated by part number 74AS1823. For ease of explanation, the gates 14-71 and 14-73 are shown as single OR gates which may be constructed using standard NAND gates designated by part number 74S20 which operates as negative input OR gates.

Figure 2B:
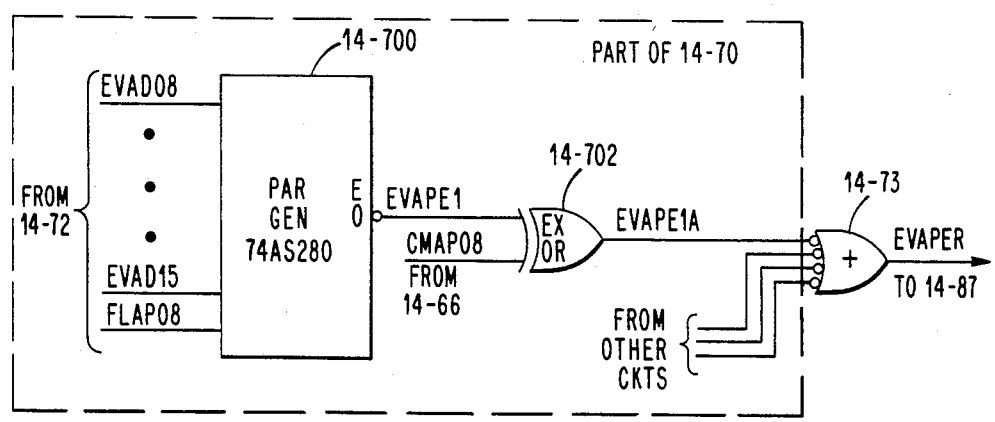

FIG. 2b illustrates in greater detail, a portion of even parity check circuits 14-70. This portion, corresponding to parity generator circuit 14-700, generates a parity error signal EVAPE1A for the next low order byte address bits EVAD08-15 stored in even latches 14-72 by combining these signals with the corresponding transform bit FLAP08 to produce output signal EVAPE1. Signal EVAPE1 is then combined with address parity bit signal CMAP08 within an exclusive OR circuit 14-702 to produce output error signal EVAP1A. This signal is applied to OR circuit 14-73 along with the three other signals generated by the remaining circuits of parity check circuit 14-70.

DESCRIPTION OF OPERATION

Figure 4:
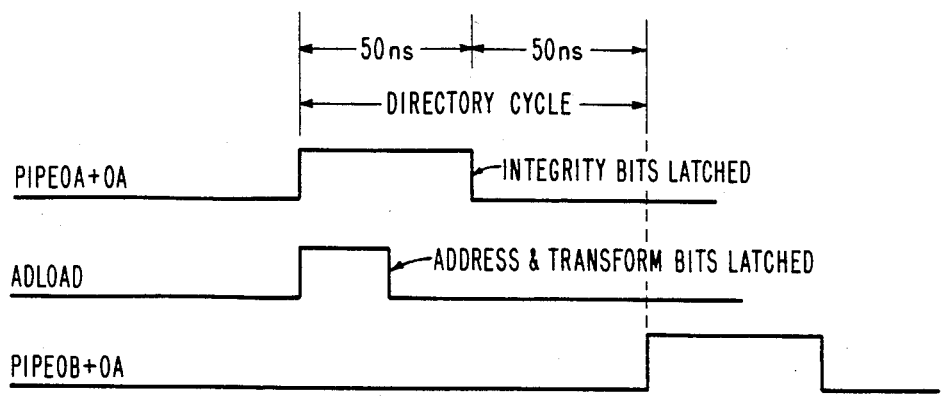

With reference to FIGS. 1 through 2b and the timing and flow diagrams of FIGS. 3 and 4, the operation of the cache subsystem 14-6 incorporating the method and apparatus of the present invention will now be described. As previously mentioned, the present invention enables cache subsystem 14-6 to maintain complete integrity within its address paths which include incrementing circuits. The cache subsystem 14-6 receives from address selector circuit 14-62 addresses from any one of the sources 14-1 through 14-5 which contain parity check bits or integrity bits. In order to minimize the time constraints imposed upon the sources, in particular, the CPU VMMU's, the arrangement of the present invention permits the arrival times of the address and integrity bits to be skewed as indicated in FIG. 4. That is, the integrity bits generated by the VMMU are permitted to be delayed up to half way through the directory cycle. At that time, they are latched on the negative going or trailing edge of timing signal PIPE-0A+0A. The address bits are latched earlier in time, such as one quarter the way through the directory cycle, in response to load signal ADLOAD. Along with the address bits, the two transform bits are also latched. Subsequently, the incremented address bits, the odd address bits and error signal if detected are latched in response to timing signal PIPE0B+0A.

The transform bits are generated in parallel during the incrementing operation by PAL circuit 14-65. As seen from FIG. 2a, circuit receives as inputs, cache memory address signals CMAD13-CMAD22 which correspond to address bits 13-22, in addition to increment carry signal INCRY0 which is low or a binary ZERO if address bits CMAD17-22 are high or binary ONES. The PAL circuit 14-65 generates as outputs, signals FLPA08 and FLPA16 which correspond to flip address parity bit 08 and 16, respectively.

The states of signals FLPAL08 and FLPAL16 are generated according to the following tables:

| FLPAP08 | | | | | | FLPAP16 | | | | | | | |
|---|---|---|---|---|---|---|---|---|---|---|---|---|---|
| C M A D 1 3 | C M A D 1 4 | C M A D 1 5 | C M A D 1 6 | I N C R Y 0 | F L P A P 0 8 | C M A D 1 6 | C M A D 1 7 | C M A D 1 8 | C M A D 1 9 | C M A D 2 0 | C M A D 2 1 | C M A D 2 2 | F L P A P 1 6 |
| (0)X | X | X | X | H | L | (0)X | X | X | X | X | X | L | L |
| (0)X | X | X | L | L | L | (2)X | X | X | X | X | L | H | L |
| (1)X | X | L | H | L | H | (3)X | X | X | X | L | H | H | H |
| (2)X | L | H | H | L | L | (4)X | X | X | L | H | H | H | L |
| (3)L | H | H | H | L | H | (5)X | X | L | H | H | H | H | H |
| (3)H | H | H | H | L | H | (6)X | L | H | H | H | H | H | L |
| | | | | | | (7)L | H | H | H | H | H | H | H |
| | | | | | | (7)H | H | H | H | H | H | H | H |

As indicated, when the carry-in signal INCRY0 is high, this indicates that no incrementing is to take place. Conversely, when signal INCRY0 is low, incrementing will take place. The states of signals INCRY0 and CMAD16 define whether there was a carry from the low order byte of the address. When an odd number of the address bits CMAD13-15 are predicted to change state as a result of the carry, the transform bit signal FLPAP08 is set to a ONE. When address bit 22 (CMAD22) is low, this indicates that no incrementing is to take place. Conversely, when address bit 22 is high, incrementing will take place. The numbers to the left side of each table in parentheses indicate the number of bits predicted to change state.

From the above tables, the Boolean or logical equations for signals FLPA08 and FLPA16 are as follows:

$$\overline{FLPA08} = \overline{INCRY0} + \overline{CMAD16} + \overline{CMAD14} \cdot CMAD15.$$

$$\overline{FLPAP16} = \overline{CMAD22} + \overline{CMAD21} + \overline{CMAD19} \cdot CMAD20 +$$
$$\overline{CMAD17} \cdot CMAD18 \cdot CMAD20.$$

In the instance where there is only a small differential between the arrival times of the address and integrity bits, PAL circuit 14-65 can also be used directly to transform the parity or integrity bits of the address. In this case, integrity or parity bit signals CMAP08 and CMAP16 are also applied as inputs to PAL circuit 14-65. The states of the transformed integrity bits CMAP08E and CMAP16E are generated according to the following tables:

| | CMAP08E | | | | | | | | CMAP16E | | | | | | | | |
|---|---|---|---|---|---|---|---|---|---|---|---|---|---|---|---|---|---|
| | C M A D 1 3 | C M A D 1 4 | C M A D 1 5 | C M A D 1 6 | I N C R Y 0 | C M A P 0 8 | C M A P 0 8 E | | C M A D 1 6 | C M A D 1 7 | C M A D 1 8 | C M A D 1 9 | C M A D 2 0 | C M A D 2 1 | C M A D 2 2 | C M A P 1 6 | C M A P 1 6 E |
| (0) | X | X | X | X | H | L | L | (0) | X | X | X | X | X | X | L | L | L |
| (0) | X | X | X | X | H | H | H | (0) | X | X | X | X | X | X | L | H | H |
| (0) | X | X | X | L | L | L | L | (2) | X | X | X | X | X | L | H | L | L |
| (0) | X | X | X | L | L | H | H | (2) | X | X | X | X | X | L | H | H | H |
| (1) | X | X | L | H | L | L | H | (3) | X | X | X | X | L | H | H | L | H |
| (1) | X | X | L | H | L | H | L | (3) | X | X | X | X | L | H | H | H | L |
| (2) | X | L | H | H | L | L | L | (4) | X | X | X | L | H | H | H | L | L |
| (2) | X | L | H | H | L | H | H | (4) | X | X | X | L | H | H | H | H | H |
| (3) | L | H | H | H | L | L | H | (5) | X | X | L | H | H | H | H | L | H |
| (3) | L | H | H | H | L | H | L | (5) | X | X | L | H | H | H | H | H | L |
| (3) | H | H | H | H | L | L | H | (6) | X | L | H | H | H | H | H | L | L |
| (3) | H | H | H | H | L | H | L | (6) | X | L | H | H | H | H | H | H | H |
| | | | | | | | | (7) | L | H | H | H | H | H | H | H | L |
| | | | | | | | | (7) | H | H | H | H | H | H | H | L | H |

It will be noted that signals CMAP08 and CMAP08E are both a function of address bits 8–15 while signals CMAP16 and CMAP16E are both a function of address bits 16–22.

From the above, the Boolean or logical equations for signals CMAP08E and CMAP16E are as follows:

$$\overline{CMAP08E} = \overline{CMAP08} \cdot \overline{INCRY0} + CMAD16 \cdot CMAP08 +$$
$$\overline{CMAD15} \cdot \overline{CMAD16} \cdot CMAP08 \cdot \overline{INCRY0} + CMAD14 \cdot$$
$$CMAD15 \cdot CMAP08 + CMAD14 \cdot CMAD16 \cdot CMAP08 \cdot$$
$$\overline{INCRY0}.$$

$$\overline{CMAP16E} = \overline{CMAD22} \cdot \overline{CMAP16} + CMAD21 \cdot \overline{CMAP16} +$$
$$\overline{CMAD20} \cdot CMAD21 \cdot CMAD22 \cdot CMAP16 + CMAD19 \cdot$$
$$\overline{CMAD20} \cdot CMAP16 + CMAD18 \cdot \overline{CMAD19} \cdot CMAD21 \cdot$$
$$\overline{CMAD22} \cdot CMAD16 + \overline{CMAD17} \cdot CMAD18 \cdot CMAD20 \cdot$$
$$CMAP16 + CMAD16 \cdot CMAD17 \cdot CMAD19 \cdot CMAD21 \cdot$$
$$CMAD22 \cdot CMAP16.$$

Now referring to FIG. 3, it will be assumed that address selector circuit 14-62 has selected CPU 0 VMMU 14-2 as the address source. At the beginning of a cache cycle as established by the cache timing circuits, portions of the selected 36-bit address is presented as inputs to the odd address latches 14-68, the even address latches 14-72, increment circuit 14-64 and parity transform circuit 14-65. In the preferred embodiment, the arrival of the 4 integrity bits CMAPEX, CMAP00 through CMAP16 can be delayed. Therefore, the 32 source address bits are latched into odd address latches 14-68. That is, address bit 22 (CMAD22) is the odd/even starting address bit. If it is a binary ZERO, this specifies that the selected source address is already even so that no incrementing need take place. If address bit 22 is a binary ONE, it specifies that incrementing takes place and that the selected source address is odd.

From the above, as seen from FIG. 3, the selected source address bits (CMAD16-21) of the low order byte which is incremented as a function of the state of address bit 22, is transferred to the even address latches 14-72 without change when bit 22 is a binary ZERO. When bit 22 is a binary ONE, the low order byte address bits CMAD16-21 are incremented by one by circuit 14-64.

While incrementing is taking place, PAL transform circuit 14-65 from the states of the low order byte address bits CMAD 16-21 operates to set the low order transform bit FPLA16 to a state which indicates whether the number of low order byte address bits predicted to change state because of incrementing is odd. If the number is odd, bit FLPA16 is set to a binary ONE and conversely is set to a binary ZERO when the number of bits predicted to change is even.

As seen from FIG. 3, PAL transform circuit 14-65 sets the next low order transform bit FLPA08 to a state which indicates whether the number of address bits (CMAD13-15) of a portion of the next low order address byte predicted to change state because of incrementing is odd. Incrementing is established by the state of the increment carry signal INCRY0 from the NAND gate 14-640 of FIG. 2a. When signal INCRY0 is a binary ONE, this indicates that no incrementing is to take place. Conversely, when signal INCRY0 is a binary ZERO indicating that the address signals CMAD17-22 are all ONES, this indicates that incrementing is to take place.

As seen from FIG. 3, if the number of next low order byte address bits CMAD13-15 predicted to change state is odd, then transform bit FLAP08 is set to a binary ONE. Conversely, if the number predicted to change state is even, then transform bit FLAP08 is set to a binary ZERO.

The address bits including 10 incremented address bits and 2 transform bits are latched into even address latches 14-72 in response to address load signal ADLOAD. At the same time, the unincremented 32 address bits are latched into odd address latches 14-68. As seen from FIG. 3, the latched transform bits are used to complement or invert the states of the later arriving byte integrity bits CMAP08 and CMAP16 which are latched into parity address latches 14-66 in response to timing signal PIPE0A+0A. Thereafter, the parity check circuits 14-69 and 14-70 are used to verify that the source address was transferred and/or incremented without error.

The arrangement of the present invention maximizes the delay in time for arrival or, stated differently, provides as much time as possible for the late arriving integrity bits by first combining the incremented address bits with the transform bits as illustrated by FIG. 2b. The intermediate result is then combined with the late arriving integriry bit such as by the exclusive OR circuit 14-702 which performs the required complementing or inverting of the integrity bit as a function of the state of the corresponding transform bit. Since both complementing and verifying are exclusive OR operations, they can be performed in any sequence with the same results.

As seen from FIG. 3, the results of the verification or checking operation are stored in pipeline flip-flops 14-86 and 14-87. That is, if any one of the 4 address bytes of the stored in the odd and even address latches 14-68 and 14-72 produce an error signal, this causes the corresponding one of the OR gates 14-71 and 14-73 to force its output to a binary ONE. This, in turn, forces one of the error flip-flops 14-86 and 14-87 to switch to a binary ONE state in response to timing signal PIPE0B+0A. The error signals generated by OR gates 14-71 and 14-73 are used to force the cache hit circuits to signal a miss condition preventing the cache subsystem 14-6 from reading out the incorrect data from its buffer memories 14-88 and 14-90. Thus, the error detected during the performance of an integrity cycle, overrides the directory cycle creating the cache miss condition.

From the above, it is seen how the method and apparatus of the present invention provides very efficient high speed generation of integrity bits for an address which is required to be transferred through an increment path. This generation can tolerate differences in arrival times between the address and its integrity bits. Additionally, for purposes of reliability, the present invention permits verification of the address transfer and/or incrementing operations.

It will be obvious to those skilled in the art that many changes may be made to the preferred embodiment of the present invention. For example, the invention may be used to generate integrity bits for any number of bytes for other types of sources for use by various types of devices. Also, other types of programmable logic devices may be employed by the present invention.

While the characteristic predicted to change state was in terms of the number of bits being odd, the characteristic could be modified. Also, while the increment operation involved adding of a constant equal to one, other types of increment operations can also be performed by the invention in a similar fashion.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A method of enabling the subsequent verification of the integrity of a transfer of an address received from any one of a number of sources through an address path including an incrementing circuit, said address including a number of integrity bits and said method comprising the steps of:
    (a) separating said number of integrity bits from said address received from any one of said number of sources;
    (b) storing said number of integrity bits;
    (c) generating a number of transform bits as a function of whether or not said received address is being incremented by said increment circuit as said address is being passed through said incrementing circuit;
    (d) storing said number of transform bits;
    (e) complementing said integrity bits according to the states of said stored number of transform bits of step (d) to produce transformed integrity bits; and
    (f) transferring said incremented address generated by said incrementing circuit together with said transformed integrity bits produced by step (e) to a utilization device for said subsequent verification.

2. The method of claim 1 wherein said method includes the step of:
    (g) checking by said utilization device said incremented address and said transformed integrity bits transferred in step (f) by summing them together to verify that said received address was transferred through said address path and/or incremented without error.

3. The method of claim 2 wherein said step (g) includes the steps of:
    (1) logically combining said incremented address with said transform bits to generate a first result; and
    (2) logically combining said first result with said integrity bits of said received address so as to allow the maximum amount of delay in the arrival time between said address and said integrity bits associated therewith.

4. The method of claim 1 wherein said utilization device is a cache memory.

5. The method of claim 1 wherein step (c) includes the steps of:
    (1) detecting whether or not said received address is to be incremented;
    (2) setting the transform bits to a first state if step 1 indicates no incrementing;
    (3) setting the transform bits to said first state if the number of bits of said address predicted to change is an even number if step 1 indicates incrementing; and,
    (4) setting the transform bits to a second state if the number of bits of said address predicted to change is an odd number if step 1 indicates incrementing.

6. The method of claim 5 wherein said received address includes a plurality of bytes and steps 3 and 4 each include the steps of:
  (a) examining each byte of said address and complementing the integrity bit associated therewith when said number of bits in said byte predicted to change by incrementing is an odd number; and
  (b) repeating step (a) until all of the bytes have been examined.

7. A method of generating integrity bits for an address received from any one of a number of sources transferred through an address path including an incrementing circuit, said address including a number of integrity bits and said method comprising the steps of:
  (a) applying at least a portion of said address to said incrementing circuit for generating an address incremented by a predetermined amount;
  (b) applying said portion of said address and corresponding ones of said number of integrity bits to a programmable logic device;
  (c) transforming said corresponding ones of said number of integrity bits into transformed integrity bits of said incremented address by said device as a function of whether or not said received address is incremented by said increment circuit as said address is being passed therethrough; and,
  (d) transferring either said received unincremented address including said number of integrity bits or said incremented address and said transformed integrity bits of step (c) to a utilization device for verification.

8. The method of claim 7 wherein said method includes the step of:
  (e) checking by said utilization device said incremented address and said transformed integrity bits of step (c) transferred in step (d) by summing them together to verify that said received address was transferred through said address path and/or incremented without error.

9. The method of claim 7 wherein said step (e) includes the step of:
  (1) logically combining said incremented address with said transformed integrity bits to generate an indication of the occurrence of an error.

10. The method of claim 7 wherein step (c) includes the steps of:
  (1) detecting whether or not said received address is to be incremented;
  (2) transferring the integrity bits without being transformed if step 1 indicates no incrementing;
  (3) transferring the integrity bits without change if the number of bits of said address predicted to change is an even number if step 1 indicates incrementing; and,
  (4) complementing the integrity bits if the number of bits of said address predicted to change is an odd number if step 1 indicates incrementing.

11. Apparatus for enabling the subsequent verification of the integrity of a transfer of an address received from any one of a number of sources through an address path including an incrementing circuit, said address including a number of integrity bits and said apparatus comprising:
  input means coupled to said sources for separately storing said number of integrity bits and said address transferred from one of said sources at different times;
  programmable logic circuit means coupled to said incrementing circuit and to said sources for receiving a number of bits of said address to be incremented, said logic circuit means generating a corresponding number of transform bits for said number of bits of said address as a function of whether or not said portion of said address is to be incremented in response to a signal received from said increment circuit as said address is being passed therethrough;
  means coupled to said circuit means for storing said number of transform bits;
  logic means coupled to said logic circuit means for complementing said integrity bits of a received unincremented address according to the states of said stored number of transform bits producing transformed integrity bits; and
  means coupled to said logic means and to said increment circuit respectively for transferring said incremented address and said transformed integrity bits to a utilization device for said subsequent verification.

12. The apparatus of claim 11 wherein said apparatus further includes:
  means for checking said incremented address and said transformed integrity bits included in said utilization device to verify by summing together that said address was transferred through said address path and/or incremented by said incrementing circuit without error.

13. The apparatus of claim 11 wherein said apparatus further includes:
  first means for logically combining said incremented address with said transform bits to generate a first result; and
  second means for logically combining said first result with said integrity bits of said source address so as to allow the maximum amount of delay between said different times.

14. The apparatus of claim 11 wherein said utilization device is a cache memory.

15. The apparatus of claim 11 wherein said apparatus further includes:
  means for detecting whether or not said received address is to be incremented; and
  said programmable logic circuit means being programmed to transfer transform bits which correspond to the states of said integrity bits without being transformed if said means for detecting indicates no incrementing,
  to set said transform bits to a first state indicative of no change if the number of bits of said number of said bits of said address predicted to change state is an even number if said detecting means indicates incrementing, and,
  to complement said transform bits to a second state if the number of bits of said address predicted to change state is an odd number if said means for detecting indicates incrementing.

16. Apparatus for verifying the integrity of a transfer of an address received through an address path including an incrementing circuit, said address including a plurality of address bits and a number of integrity bits, said apparatus comprising:
  input register means coupled to said incrementing circuit for receiving said address incremented by a predetermined amount;

a programmable logic device coupled to receive said address, said device transforming a plurality of said integrity bits into incremented integrity bits as a function of whether or not said received address is to be incremented by said increment circuit as specified by the state of at least one of said address bits; and, means for transferring either said unincremented address or said incremented address and said transformed integrity bits to a utilization device.

17. The apparatus of claim 16 wherein said apparatus further includes checking means coupled to said input register means, said checking means for verifying that said incremented address and transformed integrity bits were transferred and or incremented without error.

18. The apparatus of claim 17 wherein said checking means includes exclusive OR circuits for logically summing said incremented address with said transformed integrity bits to generate a signal indicative of an error.

19. The apparatus of claim 16 wherein said programmable logic device includes first means programmed to transfer said integrity bits without transformation if said state of said address bit specifies that no incrementing is to take place, second means programmed to transfer said integrity bits without change if the number of bits of said address predicted to change is an even number and said state of said address bit specifies that incrementing is to take place and third means programmed to complement said integrity bits if the number of address bits predicted to change state is an odd number and said state of said address bit specifies that incrementing is to take place.

20. The apparatus of claim 19 wherein said programmable logic device is a programmable array logic circuit.

* * * * *